United States Patent [19]
Phipps

[11] Patent Number: 6,093,333
[45] Date of Patent: Jul. 25, 2000

[54] METHOD FOR ETCHING THIN NICKEL IRON FILM TO MAKE A MAGNETIC RECORDING HEAD

[75] Inventor: Peter Beverly Powell Phipps, Saratogo, Calif.

[73] Assignee: International Business Machines Corporation, Armonk, N.Y.

[21] Appl. No.: 08/879,677

[22] Filed: Jun. 23, 1997

[51] Int. Cl.[7] .................................................. H05K 3/06
[52] U.S. Cl. ........................... 216/22; 216/100; 216/108; 29/603.01
[58] Field of Search .................... 216/22, 100, 108; 282/79.2

[56] References Cited

U.S. PATENT DOCUMENTS

| | | | |
|---|---|---|---|
| 3,808,070 | 4/1974 | Jordan | 216/22 |
| 4,443,294 | 4/1984 | Suenaga et al. | 216/22 |

FOREIGN PATENT DOCUMENTS

| | | | |
|---|---|---|---|
| 146627 | 2/1981 | German Dem. Rep. | 216/108 |

OTHER PUBLICATIONS

Grant & Hackh's Chemical Dictionary, 5th ed., p. 500, 1989.
Hawley's Condensed Chemical Dictionary, 12th ed. p. 996, 1993.
Petrucci, General Chemistry Princnciplies and Modern Applications, 3rd ed. p. 466–67, 1982.
Description of Hungarian Patent 174,472, Nov. 5, 1995.
"Electrochemical Aspects of the Beveling of Sputtered Permalloy Foims", Kelly, J.J. and Koel, G.J., Electrochemical Science & Technology, vol. 125, No. 6, Jun. 1978, pp. 860–865.
"Active–State Dissolution of 50N and 79NM Iron–Nickel Alloys in Phosphoric Acid Solutions", Trepak, N.M., Il'ina, L..K., and L'vov, A..L., N.G. Chernyshevskii Saratov State University, translated from Elektrokhimiya, vol. 20, No. 4, pp. 526–529, Apr. 1984.
"On the Preferred Dissolution of Iron from Thin Films of Permalloy", Kohler, M., Wiegand, A. and Lerm, A., Journal of the Electrochemical Society, Accelerated Brief Communications, pp. 2293–2294, Sep. 1985.
Hungarian Patent Description 174 472, Pinter, Istvan, Nov. 5, 1995.

*Primary Examiner*—C. Melissa Koslow
*Attorney, Agent, or Firm*—Gray Cary Ware & Freidenrich LLP; Ervin F. Johnston

[57] ABSTRACT

In the formation of a magnetic recording head or other electronic device on a substrate, at least one thin nickel iron-film is deposited on the substrate and an element is formed by etching the film. The film is first activated by disposing the film in a hydrochloric acid activating solution containing a ferrous salt. After activation, the film is removed from the activating solution and the hydrochloric acid rinsed away from the substrate. Then, the film is etched by disposing it in a sulfuric acid bath containing a ferric salt. After etching, the film is rinsed with sulfuric acid. The process substantially avoids residual corrosion of the resulting head that otherwise would be caused by chloride lingering in the etched portions of the head.

28 Claims, 2 Drawing Sheets

METHOD FOR ETCHING THIN NICKEL IRON FILM TO MAKE A MAGNETIC RECORDING HEAD

BACKGROUND OF THE INVENTION

1. Field of the Invention

The present invention relates generally to methods for making computer hard disk drive heads, and more particularly to methods for etching nickel iron plated thin films to form elements of a magnetic recording head.

2. Description of the Related Art

Thin films of nickel iron alloys are used to form elements of magnetic recording heads in computer hard disk drives. For example, thin Ni-Fe films may form pole pieces in a write head. One way to form thin film write head elements is to cover a thin film layer on a substrate with a monomer and expose to light those portions of the layer that are intended to establish the write elements. This transforms the monomer into a protective polymer film over the covered portions, and then the thin film layer can be bathed in an etchant to remove the portions of the layer that are not protected by the polymer film.

Many existing etching processes use hydrochloric acid as the etchant, particularly for thin films having an iron content of greater than 20%. The chloride in hydrochloric acid is very corrosive and thus is effective in reducing the desired portions of the thin film layer. As recognized by the present invention, however, the chloride can combine with thin film material so that the chloride continues to corrode the material during and long after manufacture. Unfortunately, the residual corrosive effect of chloride results in magnetic recording head failures and in increased manufacturing costs arising from the need to closely inspect thin film magnetic recording heads for continuing, undesirable chloride corrosion. The present invention recognizes that the phenomenon of residual chloride corrosion arises predominantly when the "final" surfaces of a magnetic recording head—i.e., the surfaces of the magnetic recording head that remain after etching—have been exposed to hydrochloric acid during etching.

Additionally, the present invention recognizes the desirability of providing a reproducible, reliable non-chloridic etchant. To this end, the present invention understands that the method disclosed in, e.g., German Patent No. 146627 is less reliably reproducible for large-scale manufacturing purposes.

SUMMARY OF THE INVENTION

A method is disclosed for etching a thin film layer containing nickel and iron deposited on or over a substrate, to form a magnetic recording head. The method includes activating the thin film layer with an activating solution of hydrochloric acid and a reducing agent, and then etching the thin film layer with an acidic etching solution containing a ferric salt.

In a preferred embodiment, the thin film layer, except for predetermined portions thereof, is covered with a protective layer, and the etching solution does not contain chloride or bromide ions. Furthermore, the preferred method contemplates rinsing the thin film layer with water between the activating and etching steps.

If desired, the activating solution can include a surfactant. Moreover, the reducing agent in the activating solution preferably is a ferrous salt, whereas the etching solution preferably contains three quarters (0.75) gram molecular weight of a ferric salt selected from the group of salts consisting of: ferric sulfate, ferric alum, and ferric nitrate per liter of etching solution. Preferably, the thin film layer is rinsed with acid after etching. A magnetic recording head made by the above process, as well as a hard disk drive incorporating the magnetic recording bead, are also disclosed.

In another aspect, a method for forming a magnetic recording head with one or more thin film layers includes exposing each layer to a hydrochloric acid activation bath containing a reducing agent. Next, the method includes removing the substrate from the activation bath and then rinsing the layer to remove hydrochloric acid therefrom. Further, the method includes exposing the layer to an acidic, substantially chloride-free and bromide-free ferric etching bath to etch at least predetermined portions of the layer.

In still another aspect, a method is disclosed for forming a pattern in a nickel-iron plated film. The method includes covering an area of the film with a protective layer, with the area corresponding to the predetermined pattern. Surface areas of the film other than the area are activated by exposing the surface areas to hydrochloric acid in combination with a reducing agent. Then, the surface areas are etched by exposing the surface areas to an acidic, chloride-free etching solution containing a ferric salt.

Accordingly, using the principles disclosed herein, it is possible to exploit the use of hydrochloric acid in an etching process for fabricating thin film nickel-iron magnetic recording heads, which is particularly desirable when the thin film has a comparatively high (50%) iron content, while reducing the likelihood of residual chloride corrosion. It is therefore an object of the present invention to provide a reproducible method for etching a thin film layer of a magnetic recording head. Another object of the present invention is to provide a method for etching a thin film layer of a magnetic recording head that does not use hydrochloric acid as the etchant. Still another object of the present invention is to provide a method for etching a thin film layer of a magnetic recording head that substantially reduces the likelihood of residual halide corrosion of the head. Yet another object of the present invention is to provide a method for etching a thin film layer of a magnetic recording head that is easy to use and cost effective.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENTS

Figure 1:
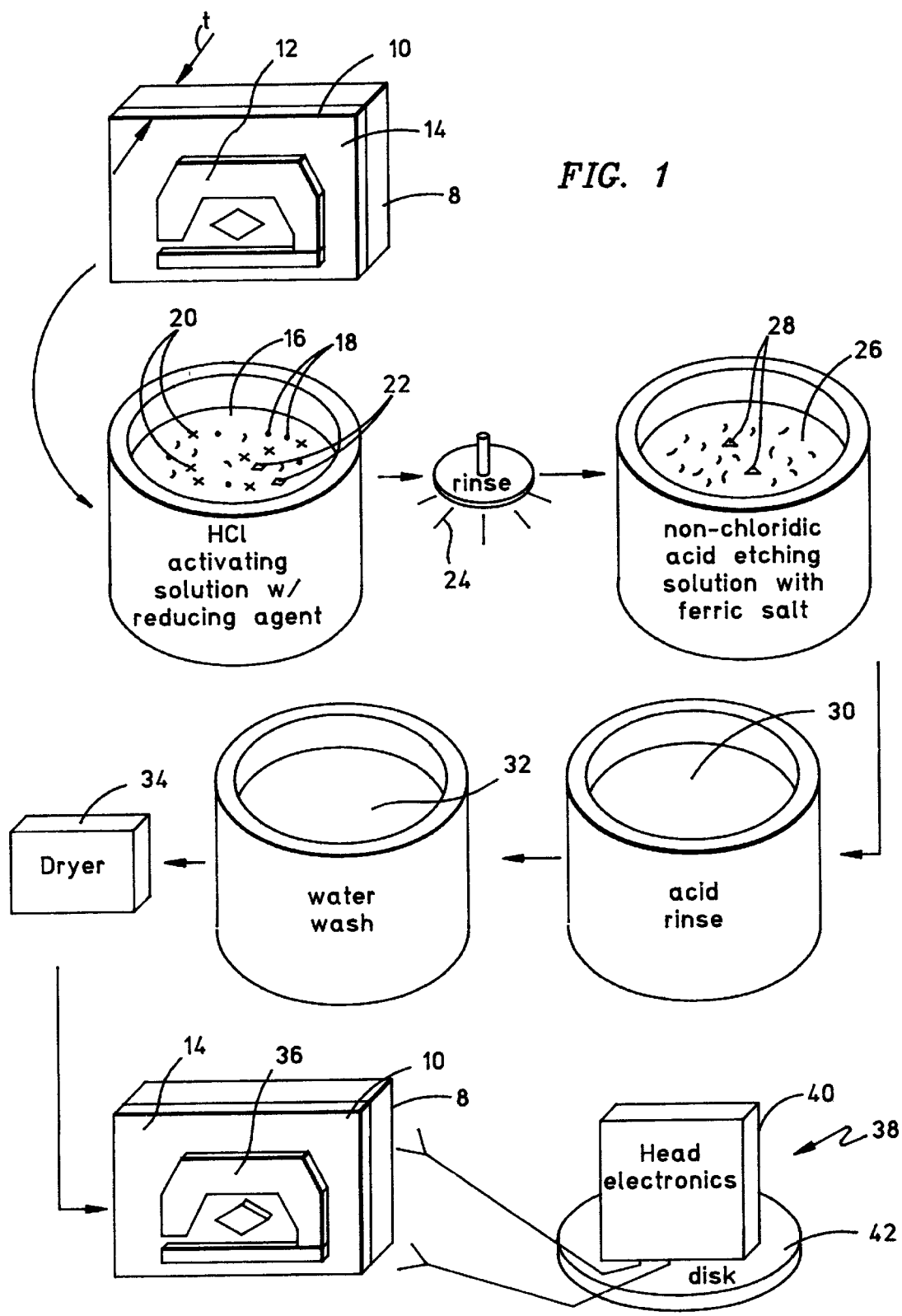
FIG. 1 is a schematic diagram of the magnetic recording head etching system of the present invention.

The present invention discloses a useful, reproducible method for etching thin films made of nickel and iron during the manufacture of magnetic recording heads for computer hard disk drives, while reducing the risk of deleterious residual chloride corrosion of the heads after etching. The method is particularly useful for etching thin metal films made of nickel (Ni) and iron (Fe), and more particularly for etching thin films having an iron (Fe) content greater than, or equal to, twenty per cent (20%) and a concomitant nickel (Ni) content less than eighty percent (80%).

Of course, I contemplate that my method would comprise one or more subsequences in a longer sequence of device manufacturing whose other steps may be performed according to current and prior knowledge. Such a sequence would be characterized by, for example, the fabrication of magnetic recording heads.

In the preferred embodiment, a substrate 8 is plated with a thin metal film 10 (FIG. 1) consisting of, e.g., fifty percent nickel (50% Ni) and fifty percent iron (50% Fe) and consequently having a relatively high saturation magnetization is provided. Plating is conventional and may be done, for example, in desired areas of a substrate. This step is represented at block 99 in FIG. 2. Preselected portions of the film 10 are covered by a protective polymer coating or layer 12, which is deposited onto the film 10 in accordance with photo-resist deposition principles known in the art. Specifically, a monomer coating is applied to the film 10 and then preselected portions of the monomer coating are activated by directing light against the preselected portions to polymerize the monomer and thereby establish the coating or layer 12. This step is represented at block 100 in FIG. 2.

After the coating or layer 12 has been deposited onto the film 10, predetermined portions 14 of the film 10 are activated with an activating solution of hydrochloric acid and a reducing agent. In the embodiment shown, activation is accomplished by disposing the film 10 in an activating bath 16 including hydrochloric acid 18 (represented by dots in FIG. 1) and a reducing agent 20 (represented by crosses in FIG. 1). The bath may be applied by spraying, by dipping, or otherwise. This step is represented at block 200 in FIG. 2. The reducing agent 20 metallizes the oxide layer on the film 10, with the chloride in the activating solution activating the film 10. As disclosed below, however, the chloride in the activating bath 16 is not allowed to remain on the film 10 during the etching process, to thereby avoid residual chloride corrosion of the film 10 and, other layers e.g., sputtered alumina that are later deposited onto the film 10.

In the preferred embodiment, the reducing agent 20 is a dissolved ferrous salt, preferably ferrous sulfate. If desired, however, the reducing agent 20 can be citrate, chromous, or hypophosphite. The hydrochloric acid 18 is concentrated from one hundredth Molar to two Molar (0.01M–2M), and is preferably one Molar. By "Molar" is meant "grams molecular weight per liter". In contrast, the ferrous salt reducing agent 20 is concentrated from one tenth Molar to two Molar (0.1M–2M), and preferably is one-half Molar (0.5M).

Additionally, a surfactant 22 (represented by squares in FIG. 1) can be included in the activating bath 16 to ensure that all appropriate surfaces of the film 10 are wetted. In one preferred embodiment, the surfactant 22 is one thousandth Molar (0.001M) "Triton X 100" surfactant manufactured by Rohm and Haas.

In accordance with the present invention, the film 10 is subjected to the activating bath 16 for a time period that is appropriate to activate the predetermined portions 14, depending on the temperature of the bath 16, the pattern to be etched, the initial thickness "i" of the passive layer on film 10, the composition of the film 10, and the limitations of the protective polymer coating or layer 12. I have discovered that for effective activation, the film 10 can be disposed in the activating bath 16 for one to five minutes (1 min.–5 min.) at a temperature of between about five degrees Centigrade and thirty degrees Centigrade (5° C.–30° C.) when the film 10 has a composition of forty five percent Nickel (45% Ni) and fifty five percent iron (55% Fe).

Figure 2:
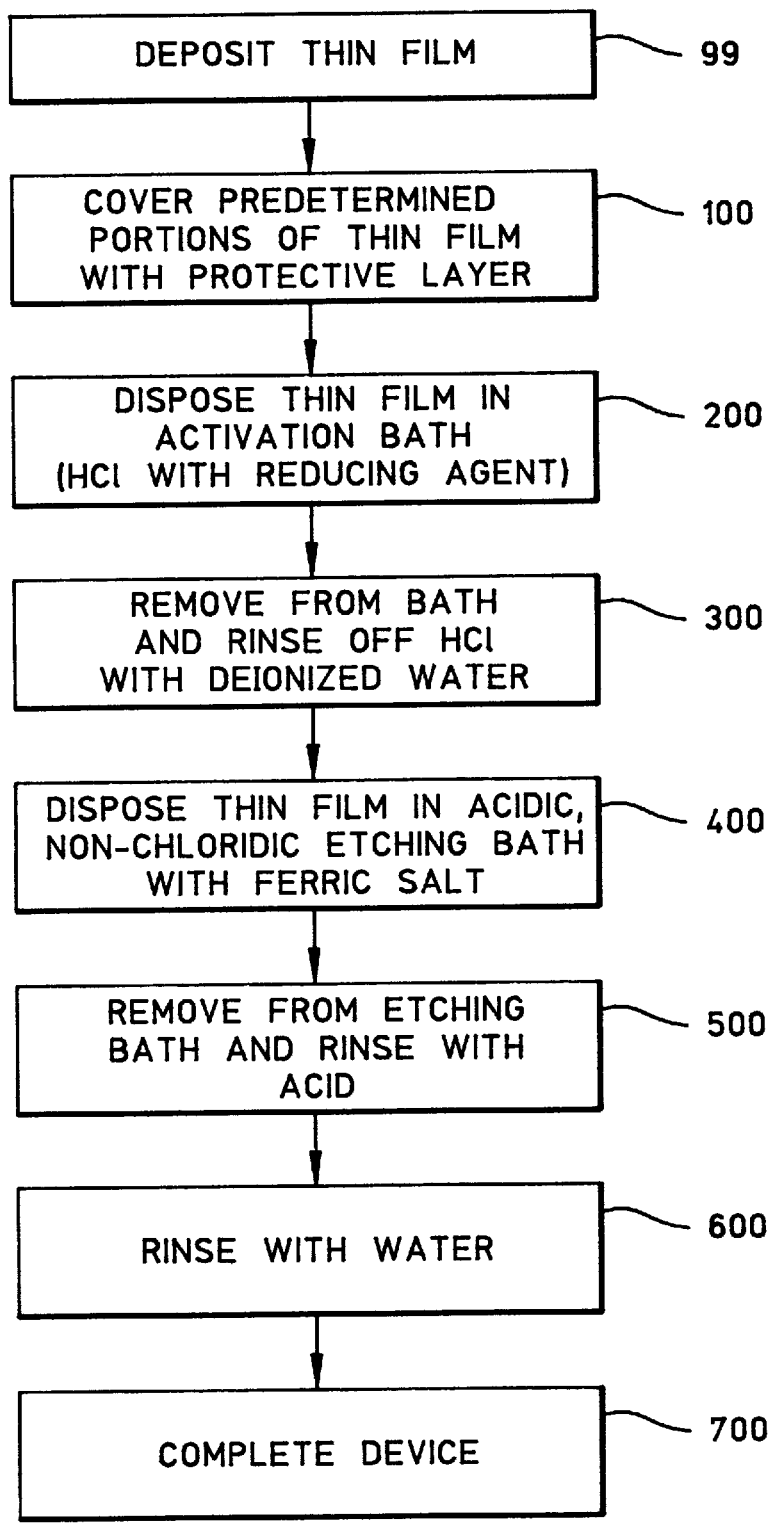
FIG. 2 is a flow chart of the magnetic recording head etching method.

After activation, the layer 10 is rinsed with deionized water 24, as indicated at block 300 in FIG. 2. As with activation bathing, rinsing may be performed by spraying, dipping or otherwise. I have discovered that this process reduces the likelihood of residual chloride corrosion of the material that forms the layer 10 after etching, and also reduces the risk of contaminating the etchant with chloride.

As shown schematically in FIG. 1 and as indicated at block 400 of FIG. 2, the layer 10 is next disposed in an etchant or etching bath 26, again by spraying, dipping, or other means. Per the present invention, the etching bath 26 is an acidic, non-chloridic solution containing a dissolved ferric salt 28 (represented by triangles in FIG. 1) for corroding the activated predetermined portions 14 of the layer 10 to thereby establish a predetermnined pattern on the layer 10. For example, the ferric salt 28 can be ferric sulfate, ferric alum, or ferric nitrate, and the non-chloridic acid can be sulfuric acid having a concentration of between one hundredth Molar and three Molar (0.01M–3M), preferably one Molar. In contrast, the ferric salt 28 is concentrated from one tenth Molar to two Molar (0.1M–2M), and preferably is three-quarters Molar (0.75M). Acids other than sulfuric, e.g., nitric acid, can be used in the etching bath 26 to reduce the pH of the bath 26 to one and one-half (1.5), provided that no chloride or bromide is present in the acid. Thus, hydrochloric acid and bromic acid are not used in the etching bath 26. Accordingly, the etching bath 26 is non-chloridic.

In accordance with the present invention, the layer 10 is disposed in the etching bath 26 for a time period that is appropriate to etch the predetermined portions 14, depending on the temperature of the bath 26, the pattern to be etched, the initial thickness "t" of the layer 10, the composition of the layer 10, and the limitations of the protective polymer coating or layer 12. I have discovered that after effective activation, the layer 10 can be disposed in the etching bath 26 for one to five minutes (1 min.–5 min.) at a temperature of between about five degrees Centigrade and fifty degrees Centigrade (5° C.–50° C.) when the layer 10 has a thickness "t" of three microns (0.003 mm) and a composition of forty five percent Nickel (45% Ni) and fifty five percent iron (55% Fe).

After etching, the layer 10 is removed from the etching bath 26 and is then disposed in an acidic rinsing solution 30, as shown in FIG. 1 and as indicated at block 500 in FIG. 2 wherein the acidic rinsing solution 30 is preferably a chloride-free acid. In one preferred embodiment, the rinsing solution is sulfuric acid having a concentration of between one hundredth Molar and three Molar (0.01M–3M), preferably one Molar. Then, the layer 10 is removed from the acidic rinsing solution 30 and washed with deionized water 32 as indicated at block 600 in FIG. 2, and then dried in the atmosphere or in a dryer 34.

FIG. 1 shows that after the process described above, the protective polymer coating or layer 12 is removed, leaving preselected portions 36 of the layer 10 that have not been etched and consequently that stand out in relief from the predetermined portions 14 in a predetermined pattern. As shown, the layer 10 after etching establishes one or more elements of a magnetic recording head, with the preselected portions 36, e.g., establishing read/write poles of the head. Typically, the head is formed integrally with a slider, with the slider then being installed in a hard disk drive, generally designated 38, that includes head electronics 40 and a data storage disk 42. The remaining processing steps necessary to fabricate other elements and prepare the head for use are represented by block 700 in FIG. 2.

EXAMPLE 1

A thin film having a thickness "t" of three microns (0.003 mm) and a composition of forty five percent Nickel (45%

Ni) and fifty five percent iron (55% Fe) is activated at 20° C., in 1M hydrochloric acid containing 0.5M ferrous sulfate and 0.001M "Triton X 100" surfactant for 3 minutes, rinsed with deionized water, and then etched at 20° C., in 1M sulfuric acid containing 0.75M ferric sulfate for 3 minutes. After etching, the substrate is rinsed in 1M sulfuric acid, and then thoroughly washed with deionized water and dried.

While the particular METHOD FOR ETCHING THIN NICKEL IRON FILM TO MAKE A MAGNETIC RECORDING HEAD as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which are or may become obvious to those skilled in the art. For example, the invention is applicable to the manufacture of bubble memories, or to any electronic device that incorporates a thin film layer of nickel iron material deposited on a substrate. Further, I have found that the various phases or steps of the method that embodies my invention may be varied or combined with known method steps. For example, the activation bath and rinse according to my invention may be followed by etching according to prior art steps, using prior art materials. Therefore, the scope of the present invention is accordingly to be limited by nothing other than the appended claims.

I claim:

1. A method for forming a magnetic recording head from a substrate that supports a nickel-iron thin film layer, comprising:
   disposing the thin film layer in a hydrochloric acid activation bath containing a reducing agent;
   removing the thin film layer from the activation bath;
   rinsing the thin film layer to remove hydrochloric acid therefrom; and
   disposing the thin film layer in an acidic, substantially chloride-free ferric etching bath to etch the thin film layer.

2. The method of claim 1, wherein the thin film layer, except for the predetermined portions thereof, is covered with a protective layer.

3. The method of claim 2, wherein the activation bath includes a surfactant.

4. The method of claim 3, wherein the reducing agent is a ferrous salt.

5. The method of claim 4, wherein the etching solution includes a ferric salt.

6. The method of claim 5, wherein the ferric salt is selected from the group of salts consisting of: ferric sulfate, ferric alum, and ferric nitrate.

7. The method of claim 6, further comprising removing the thin film layer from the etching bath and rinsing the substrate with a substantially chloride-free acid.

8. The method of claim 7, wherein the ferric salt in the etching solution is concentrated at three quarters (0.75) gram molecular weight per liter of etching solution.

9. A method for forming a pattern in a nickel-iron plated film, comprising:
   covering an area of the film with a protective layer, the area corresponding to the pattern;
   activating surface areas of the film other than the area by exposing the surface areas to hydrochloric acid in combination with a reducing agent; and
   etching the surface areas by exposing the surface areas to an acidic, chloride-free etching solution containing ferric salt.

10. The method of claim 9, further comprising rinsing the substrate between the activating and etching steps.

11. The method of claim 1, wherein activating surface areas includes exposing the surface areas to a surfactant.

12. The method of claim 9, wherein the reducing agent is a ferrous salt.

13. The method of claim 9, wherein the ferric salt is selected from the group of salts consisting of: ferric sulfate, ferric alum, and ferric nitrate.

14. The method of claim 9, wherein the thin film is rinsed with a substantially chloride and bromide free acid after etching.

15. The method of claim 9, wherein the ferric salt in the etching solution is concentrated at three quarters (0.75) gram molecular weight per liter of etching solution.

16. A method for etching a thin film layer on a substrate, the thin film layer including nickel and iron, to form a magnetic recording head, comprising:
   activating the thin film layer with an activating solution of hydrochloric acid, a reducing agent and a surfactant;
   after said activating, rinsing the thin film layer with water; and
   after said rinsing, etching the thin film layer with an acidic etching solution containing a ferric salt.

17. A method for etching a thin film layer on a substrate, the thin film layer including nickel and iron, to form a magnetic recording head, comprising:
   activating the thin film layer with an activating solution of hydrochloric acid and a ferrous salt; and
   etching the thin film layer with an acidic etching solution containing a ferric salt.

18. A method for etching a thin film layer on a substrate, the thin film layer including nickel and iron, to form a magnetic recording head, comprising:
   activating the thin film layer with an activating solution of hydrochloric acid and a reducing agent; and
   etching the thin film layer with an acidic etching solution containing a ferric salt, but containing no chloride and/or bromide.

19. A method for etching a thin film layer on a substrate, the thin film layer including nickel and iron, to form a magnetic recording head, comprising:
   activating the thin film layer with an activating solution of hydrochloric acid and a reducing agent; and
   etching the thin film layer with an acidic etching solution containing a ferric salt, wherein the ferric salt is selected from the group of salts consisting of ferric sulfate, ferric alum and ferric nitrate.

20. A method for etching a thin film layer on a substrate, the thin film layer including nickel and iron, to form a magnetic recording head, comprising:
   activating the thin film layer with an activating solution of hydrochloric acid and a reducing agent;
   etching the thin film layer with an acidic etching solution containing a ferric salt; and
   after etching, rinsing the thin film layer with a substantially chloride-free acid.

21. A method for etching a thin film layer on a substrate, the thin film layer including nickel and iron, to form a magnetic recording head, comprising:
   activating the thin film layer with an activating solution of hydrochloric acid and a reducing agent; and
   etching the thin film layer with an acidic etching solution containing a ferric salt, wherein the ferric salt in the etching solution is concentrated at three quarters (0.75) gram molecular weight per liter of etching solution.

22. A method of forming an element of an electronic device, comprising:

depositing a nickel iron thin film on a substrate;

covering an area of the film with a protective layer, the area corresponding to and element pattern;

activating surface areas of the film other than the area by exposing the surface areas to hydrochloric acid in combination with a reducing agent; and etching the surface areas by exposing the surface areas to an acidic, chloride-free etching solution containing ferric salt.

23. The method of claim 22, further comprising rinsing the film between the activating and etching steps.

24. The method of claim 23, wherein activating surface areas includes exposing the surface areas to a surfactant.

25. The method of claim 22, wherein the reducing agent is a ferrous salt.

26. The method of claim 22, wherein the ferric salt is selected from the group of salts consisting of: ferric sulfate, ferric alum, and ferric nitrate.

27. The method of claim 22, wherein the thin film is rinsed with a substantially chloride and bromide free acid after etching.

28. The method of claim 22, wherein the ferric salt in the etching solution is concentrated at three quarters (0.75) gram molecular weight per liter of etching solution.

* * * * *